UNITED STATES PATENT OFFICE.

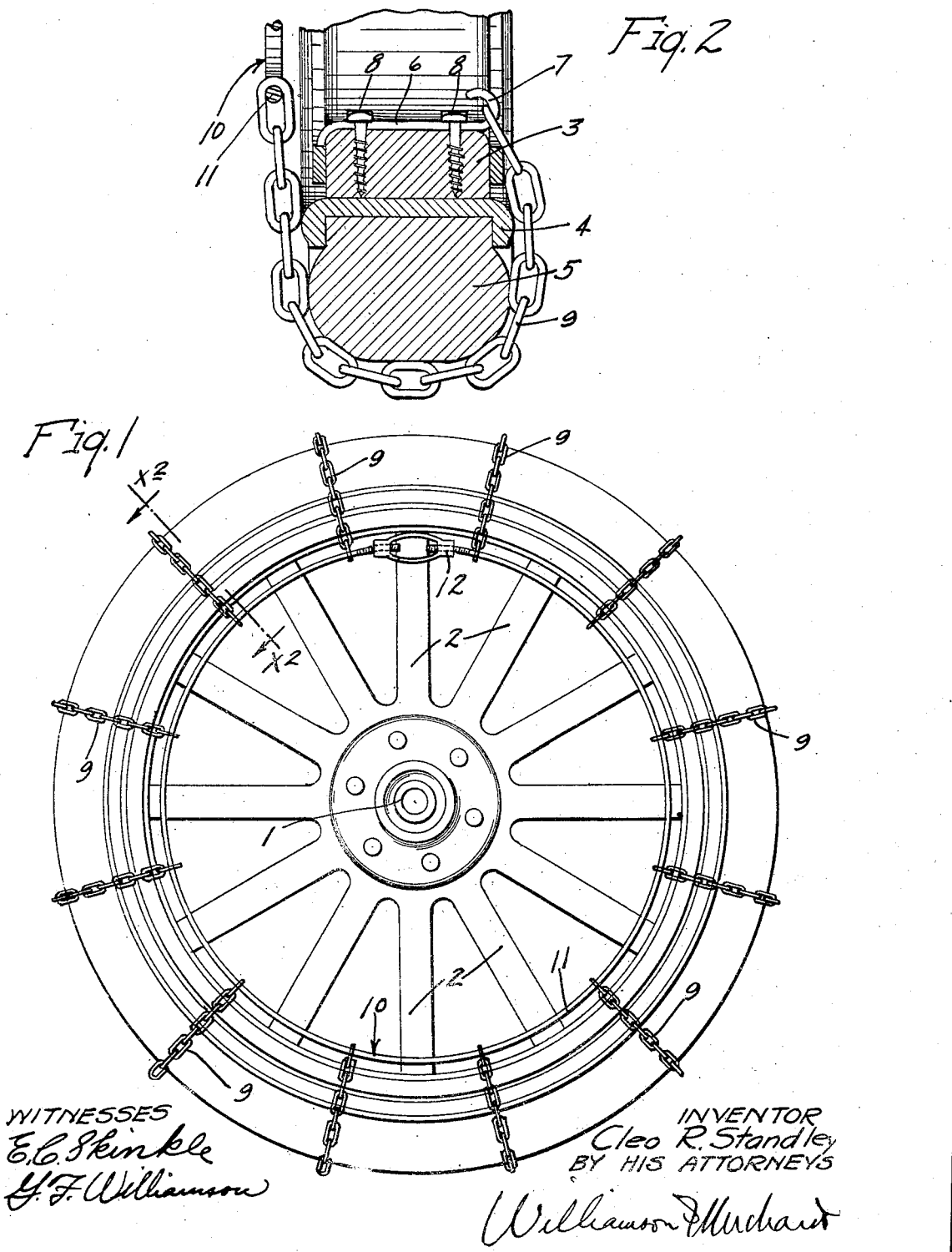

CLEO R. STANDLEY, OF BOONE, IOWA.

NON-SKID TIRE-CHAIN.

1,213,290.

Specification of Letters Patent. Patented Jan. 23, 1917.

Application filed February 2, 1916. Serial No. 75,699.

*To all whom it may concern:*

Be it known that I, CLEO R. STANDLEY, a citizen of the United States, residing at Boone, in the county of Boone and State of Iowa, have invented certain new and useful Improvements in Non-Skid Tire-Chains; and I do hereby declare the following to be a full, clear, and exact description of the invention, such as will enable others skilled in the art to which it appertains to make and use the same.

My invention relates to improvements in non-skid chains for tires; and, to this end, it consists of the novel devices and combinations of devices hereinafter described and defined in the claim.

In the accompanying drawings, which illustrate the invention, like characters indicate like parts throughout the several views.

Referring to the drawings, Figure 1 is a view in side elevation of a truck wheel having the invention applied thereto in working position; and Fig. 2 is a view in transverse section taken on the line $x^2$ $x^2$ of Fig. 1, on an enlarged scale.

Of the parts of the wheel shown, the numerals 1 to 5 indicate, respectively, the hub, spokes, felly, rim and tire.

The numeral 6 indicates a multiplicity of circumferentially spaced anchor lugs which extend transversely of the wheel between the adjacent pair of spokes 2 and rest directly upon the inner face of the felly 3. The ends of the anchor lugs 6, on one side of the wheel, terminate in hooks 7 and the ends thereof are turned outwardly against the adjacent side of the felly 3 to assist in holding the anchor lug 6 in position. Lag screws 8 rigidly secure the anchor lugs 6 to the felly 3. It is, of course, understood that the anchor lugs 6 may take various different forms.

Non-skid chains 9 extend transversely over the tire 5 with their ends extending radially toward the hub 1. The end links of the chains 9, on one side of the wheel, are detachably secured to the anchor lugs 6 by passing the same over the hooks 7 and the end links, on the other side of the wheel, are all attached to a circumferentially adjustable clamping device 10. As shown, this clamping device 10 is in the form of a transversely divided hoop or ring 11, the ends of which are screw-threaded and adjustably connected by a turn buckle 12. This hoop 11 is passed loosely through the ends links of the chain 9, on the respective side of the wheel.

By positively anchoring one end of the chains to the wheel, on one side thereof, and connecting the other end of the chains to a hoop, on the other side of the wheel, with freedom for a limited circumferential movement with respect to the wheel, the tendency of said chains, as they alternately come in contact with the roadbed, is to move diagonally across the tire, thereby tending to hold the wheel against either a forward or side skidding movement.

Among the many advantages, the improved non-skid chains have over the chains now in use, is that when in position on the wheel, they will not come off and there are no loose parts to catch in the grease cups, brake connections, or other projecting parts of the vehicle. In case one of the chains breaks in the middle, the piece on the respective hook 7 will automatically drop off, under the rotation of the wheel, and the piece on the hoop 11, which is on the outside of the wheel, cannot do any damage. A full set of the chains 9 can be put on, without turning the wheel. Tension on the hoop 11 is evenly distributed, as all of the chains 9 tighten at the same time under the strain of the chain, in engagement with the roadbed.

The above described invention has, in actual usage, particularly on trucks, proven highly efficient for the purpose had in view. By not drawing the chains 9 too tightly across the tire, by means of the hoop 11, said chains will shift circumferentially on the tire and not ride at all times in the same place. The advantage of this is that the chains 9 will not cut the rubber in the tire, but distribute the wear.

The hoop or ring 11 is shown in the drawings as made from a single piece of metal that is round in cross section and bent to proper form, but it is, of course, understood that the same may be made from a piece of wire cable or other suitable material.

What I claim is:—

The combination with a wheel, of a multiplicity of circumferentially spaced chains extending transversely over the tire of the wheel, each chain having one of its ends positively anchored to the wheel, and a hoop loosely inserted through the other ends of the chains whereby the chains are free to move independently on the hoop and on the wheel in circumferential directions.

In testimony whereof I affix my signature in presence of two witnesses.

CLEO R. STANDLEY.

Witnesses:
J. W. JORDAN,
WALTER R. DYER.